Feb. 6, 1940. M. T. WINTSCH 2,188,991
AUTOMATIC RAILWAY SIGNALING SYSTEM
Filed Sept. 8, 1937 2 Sheets-Sheet 1

INVENTOR.
Max Theodore Wintsch,
BY
Samuel Schwartz
ATTORNEY

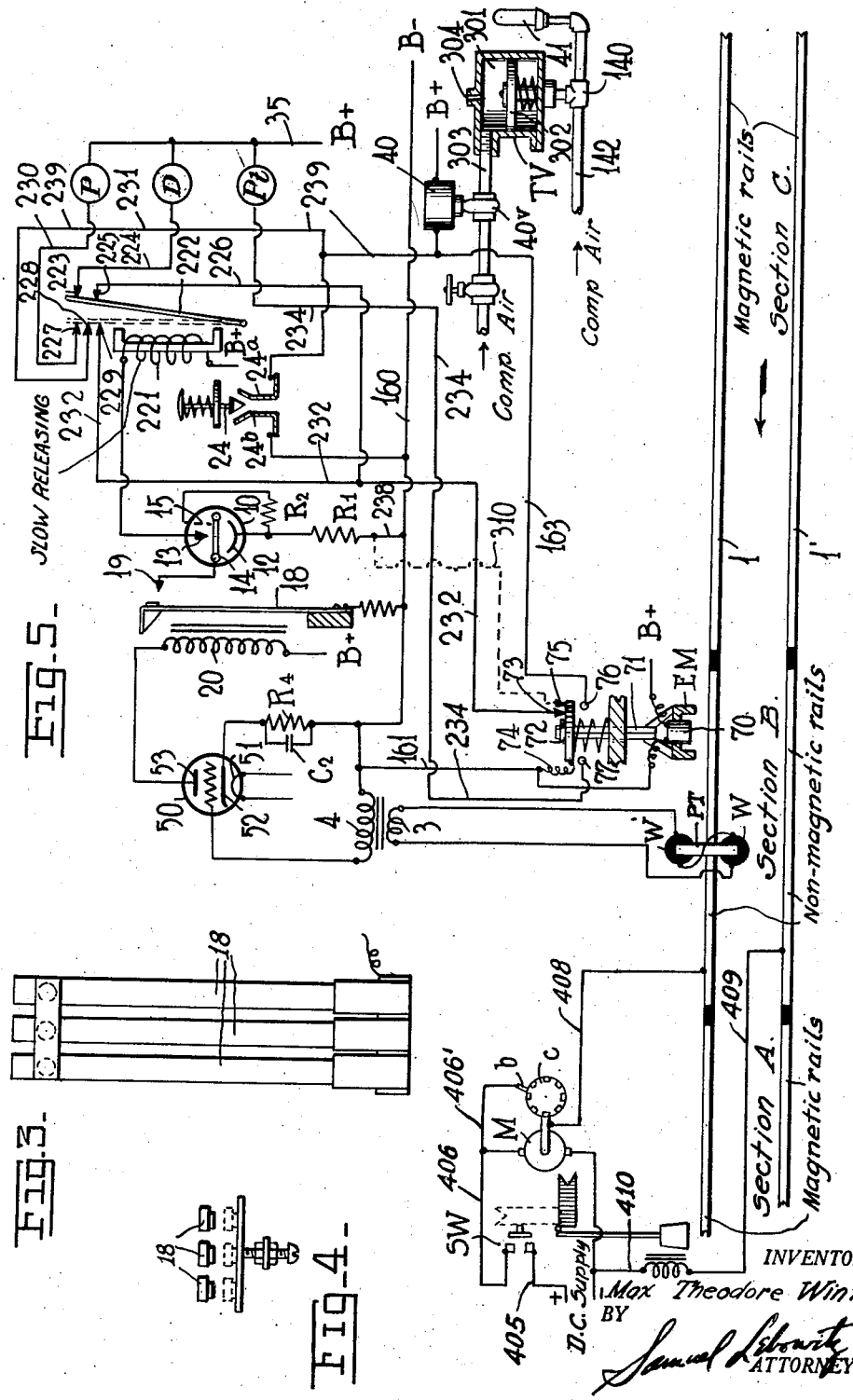

Patented Feb. 6, 1940

2,188,991

UNITED STATES PATENT OFFICE 2,188,991

AUTOMATIC RAILWAY SIGNALING SYSTEM

Max Theodore Wintsch, Lancaster, Pa., assignor of one-half to Newton M. Weaver, Lancaster, Pa.

Application September 8, 1937, Serial No. 162,940

20 Claims. (Cl. 246—63)

This invention relates to an automatic train control apparatus embodying a rail vehicle signaling system adapted to be controlled by traffic conditions along the trackway. The invention also comprehends the interconnection of suitable speed control or braking mechanism with the signals indicated in the vehicle.

One of the objects of the invention is to provide a simple and rugged system which is nevertheless sensitive to minute currents transferred from the trackway signaling circuits to the receiver traveling over the trackway.

The invention herein comprehends an improvement over the systems disclosed in my earlier Patents Nos. 2,059,160 and 2,059,161 of October 27, 1936, and in my co-pending application, Ser. No. 88,907, filed July 3, 1936, Patent No. 2,105,134, January 11, 1938. The present system is a considerable simplification of the former systems but is similar in its composing parts. Mechanical tuning instead of electrical tuning is utilized, as in the former above mentioned systems; no electrical filters are required. The new equipment is equally well adapted to operate on A. C. continuous; or D. C. or A. C. intermittent; or continuous pulsating track circuits of the direct current and the coded type.

A further object of the invention is to provide a sensitive relay device constituted by a grid-glow tube composed of a plurality of cold elements for the purpose of exercising the proper effect upon the cab indicating and control mechanism without requiring several stages of amplification for the energy picked up by the receiver in the vehicle traveling over the trackway from the trackway circuits. Compared with other systems of this type, only a limited number of relays and operating parts are required.

Another object of the invention is to associate a grid-glow tube with control elements therefor for governing the conductivity thereof in order to obtain a critical operation of the signaling system. These control elements may be in the form of photo-electric cells, one or more mechanical reed filters tuned to the desired frequencies of the signaling currents, or the potentials produced by the conductive conditions of an electronic tube.

Another object of the invention contemplates the combination of a grid-glow tube with one or more vibrating-reed relays to obtain an extremely rugged and sensitive system maintaining its adjustments for a long period of time.

The basic features of the present invention may be applied to all types of railway signaling systems known in the art to attain the advantages accruing therefrom. For example, the features of the invention may be applied to continuous cab signaling systems as well as to intermittent cab signal indicating systems.

It is a further object of the invention to provide several types of signaling systems having a generic inventive feature common to all, namely, the incorporation of a grid-glow tube therein.

Other objects and purposes will appear in the more detailed description following hereinafter, taken in conjunction with the accompanying drawings wherein like elements in the several figures are designated by like reference characters.

In the drawings:

Figure 3 is a front elevation of a vibrating reed unit which may be employed in my arrangements;

Figure 4 is a plan view of Figure 3; and

Figure 5 is a circuit diagram of an inductive non-contact intermittent cab signal indicating system.

Figure 1 illustrates a cab signal system for rail vehicles which is particularly adapted to operate in conjunction with the trackway circuits disclosed in my prior patents, Nos. 2,059,160 and 2,059,161.

Figure 1:
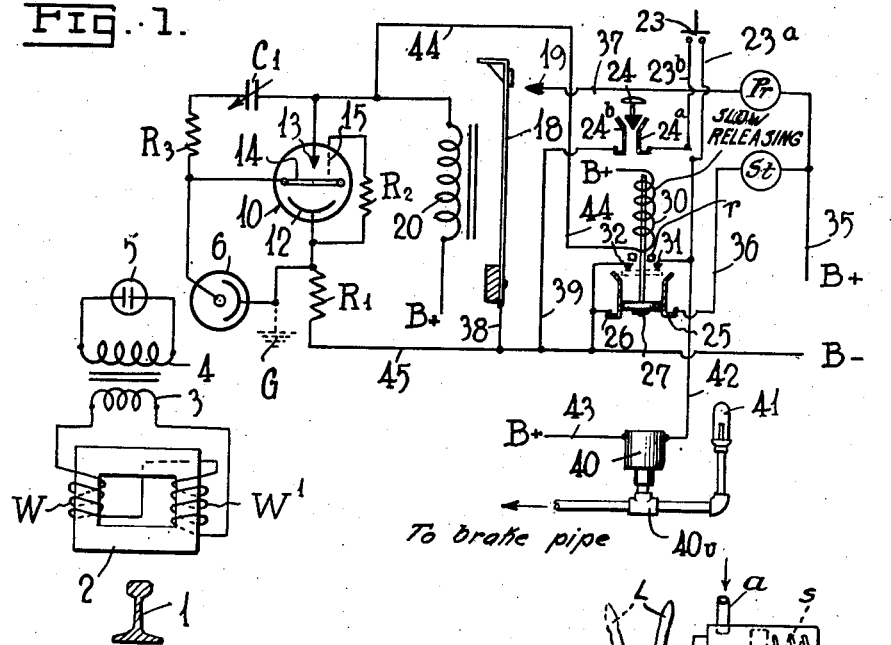
Figure 1 shows a circuit diagram for a continuous cab signaling indicating system embodying two signal lights giving three cab indications, an automatic stop, a flashing "Caution" signal, and a photo-electric pick-up.

In Figure 1, a pick-up device 2, having windings W and W' thereon, is shown in coupled arrangement with the rail 1 in which may travel the trackway currents for exercising the desired controls. The windings are arranged in a manner fully described in my application Ser. No. 88,907, Patent No. 2,105,434, January 11th, 1938, referred to above. The currents picked up from the rail by the windings W and W' are transferred to the transformer secondary winding 4 by the primary winding 3 thereof. In the secondary circuit is disposed a neon lamp 5 which glows in response to the alternating currents picked up inductively from the rail circuit. The luminosity of this lamp conditions the subsequent parts of the apparatus in order to indicate the presence or absence of signaling currents in the trackway which in turn effects the proper indications and exercises the necessary controls in dependency upon such conditions.

The basic feature of my present invention constitutes the use of a highly sensitive yet ruggedly constructed grid-glow tube 10 which may be of the type KU-618 or a similar tube. Distinctive features of this tube are its very rugged mechanical design, unusual long life, constant characteristics, low control power, instantaneous response, and high efficiency. This tube contains three main electrodes, namely, a cylindrical plate cathode 12, a single wire anode 13, surrounded by a single wire grid 14, which constitutes the third electrode. A fourth electrode 15, serves as a shield and is not intended as a control electrode. Differing from the ordinary vacuum tube, this grid-glow tube has no heated filament, and therefore does not consume energy when it does not operate. Its electrodes remain cold even while the tube is glowing. If a voltage of the proper value is applied between the positive and negative electrodes, particles of electricity called "free electrons" attach themselves to the grid. When this grid is thoroughly insulated, these minute charges of electricity cannot escape, thus preventing the tube from passing an anode-cathode current. In my new system, this tube replaces several mechanical relays, resulting in extremely few moving and wearing parts in the present system of automatic cab signaling. In the modification illustrated in Figure 1, one stage of vacuum-tube amplification may be interposed between the secondary winding 4 and the neon tube 5 if deemed necessary, and in the other illustrated arrangements, also only one stage of amplification suffices when three or four stages were necessary heretofore.

The grid-glow tube KU-618 requires an operating voltage of 440 volts at a frequency of not over 500 cycles, and the current requirements do not exceed 15 milliamperes through the anode-cathode circuit in the tube. To operate the relays and the brake valve solenoid, 1.5 amperes should suffice. This current may be obtained by a steam driven generator, or in the case of an electrically propelled vehicle by means of resistors from the propelling power of the vehicle.

Referring to Fig. 1, two signal lights Pr and St are in the operator's cab. A combination of these two signals results in the "Caution" signal indication, which is an alternate flashing of the "Pr" signal light and the "St" signal light.

The photo-electric cell 6 is disposed in the line of light emission from the neon lamp 5. This cell is bridged across the cathode 12 and the grid 14 of the grid-glow tube 10. A resistor R3 and a variable condenser C1 adjusts the grid-glow tube for operation. The shield of the grid-glow tube 15 is connected with the cathode 12 through a resistor R2. Another resistor R1 maintains the cathode at the proper potential with respect to the remainder of the system.

A coil winding or electromagnet 20 for operating a tuned reed 18 is connected in the output circuit of the grid-glow tube 10 in which is disposed a positive source of potential B+. The tuned reed 18 may be in the form of a group of reeds as shown in Figures 3 and 4.

Under normal conditions of vehicle travel with at least two blocks in advance of the vehicle unoccupied, the glowing lamp 5 will cause the photoelectric cell 6 to be conductive and thereby to enable the blocking electrons to leak away from the grid 14 to ground G. The conductive condition of the grid-glow tube will cause the energization of the electromagnet 20 to cause a vibration of the mechanical reed switching unit 18 in accordance with the frequency of the pulsations or alternations of the current in the coil 20 arising from the effects of an alternating current of predetermined frequency flowing in the rails, or from a pulsating direct current therein of predetermined frequency. Consequently, a circuit for the "Proceed" lamp will result by way of the B+ terminal, conductor 35, lamp "Pr", conductor 37, contact 19, reed 18, conductor 38 to the B— terminal.

The slow pick-up control relay 30 is also energized through the B+ terminal, coil 30, conductor 44 and the anode-cathode circuit of the grid-glow tube to the B— terminal. The delayed operation of relay may be derived by providing a brass or copper ring r on the relay core coaxially with the coil 30. Thereby contactor 27 is raised to close the circuit for the solenoid 40 for normally holding the brake applying valve closed through the B+ terminal, conductor 43, solenoid 40, conductor 42, elements 31, 27 and 32 back to the B— terminal. The valve 40v is preferably interconnected with the vehicle braking system and exhausts to the atmosphere, gradually applying the brakes. Likewise, the warning whistle 41 is controlled by the operation of the solenoid 40.

Figure 2:
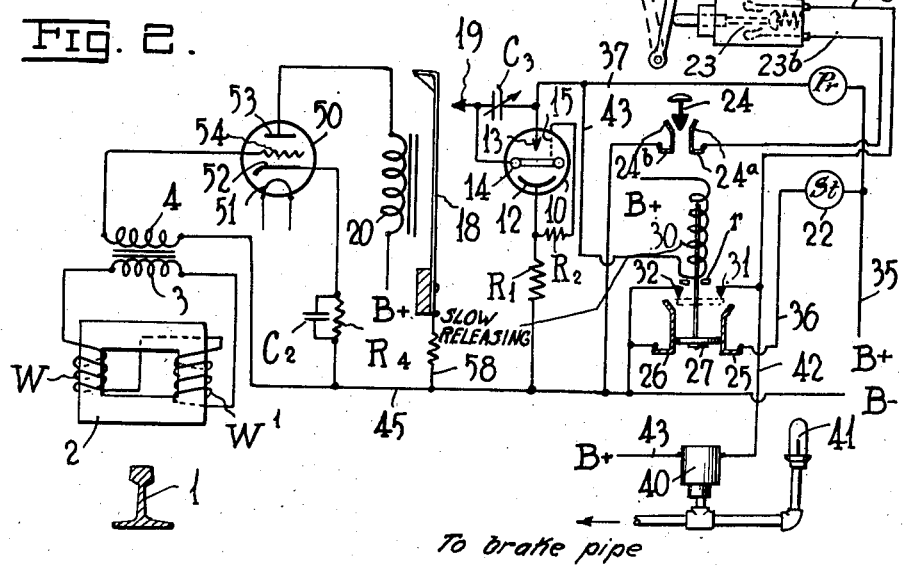
Figure 2 is a different embodiment of the invention showing the control of the grid-glow tube exercised by a mechanical tuned-reed relay.

In the case of a dangerous condition in the system, currents are no longer induced in the pick-up device which causes a failure of the lamp 5 to light. Thereby a negative charge accumulates on the grid 14 of the grid-glow tube which is not conducted away by the photo-electric cell 6. A blocking of the tube results therefrom, causing the deenergization of the relay 20, and the circuit of the "Proceed" lamp is broken at the reed 18 and the contact 19. Likewise, the relay 30 is deenergized and the contact 27 bridges the contacts 25 and 26 closing the circuit for the "Stop" lamp running from the B+ terminal through the conductor 35, the stop lamp St, conductor 36, elements 25, 27 and 26 to the B— terminal. The movement of switch 27 from contacts 31 and 32 will cause the deenergization of the solenoid 40 which will bring into operation the brake applying mechanism and the warning whistle unless the operator makes some acknowledgment of the restrictive condition by pressing the switch 24 to provide a new circuit for the solenoid 40 across the switch elements 24a and 24b through conductor 39 connected with the B— terminal. A switch 23 may be serially connected into the conductor 42 for the purpose of placing a checking action on the operation of the manually operated switch 24, limiting the closing of the operating circuit for the valve coil 40 by means of the switch 24 by the vehicle operator to be effective only if the operator has manually applied the vehicle brakes by means of his brake valve, thereby manually controlling the movement of the vehicle. If the switch 23 is open, the manual operation of the switch 24 will have no effect in regard to the operation of the valve coil 40. The switch 23 may be so constructed as to close its contacts by the operation of some physical control means in response to the voluntary movement of the operator occasioned by the taking of some action to control the vehicle in the light of the existing signal indicating the condition of the track. Such control means may be the handle of the operator's brake valve lever when moved to the brake application position. In the case of an electrically propelled vehicle this control may be attained by the movement of the controller-lever to the "off" position. In Figure 2 of the drawings is shown the lever L for operating the vehicle brake mechanism also controlling the switch 23. The lever L may be controlled manually or may be controlled by the admission of compressed air into the brake cylinder X by way of the conduit a. The piston in the cylinder is pushed back against the spring s which also pushes the switch 23 out of contact from the terminals connected to the conductor 23a and 23b. When the engineer applies the brakes, the air against the piston in the brake cylinder is released, whereupon the piston together with the switch button 23 moves outwardly, closing the switch and the circuit across 23a and 23b.

In the case of "Caution" conditions existing along the railroad, the track control current will flow interruptedly as fully described in my Patents Nos. 2,059,160 and 2,059,161 causing the display of the "Caution" signal by the alternate flashing of the "Proceed" and "Stop" lights. For example, an alternating current having a frequency of 100 cycles is periodically interrupted, being on for three seconds and being off for three seconds for the purpose of producing a caution indication.

In the system shown in Fig. 2, a stage of amplification is coupled to the secondary 4 of the transformer. The amplifier tube 50 is composed of a heater 51 causing the cathode 52 to emit electrons through the grid 54 towards the plate 53. The relay 20 is connected to the output circuit of the amplifier and the transformer secondary 4 is connected to the input thereof between the grid 54 and the cathode 52. Suitable biasing relationships are maintained by the resistor-capacity unit R4—C2.

The existence of trackway currents of predetermined frequency causes the operation of the vibrator reed 18 which will vibrate at its natural period tuned indirectly to a frequency period of the track control current which in the present case should not be lower than 100 cycles per second so that a steady operation of the grid-glow tube may be secured. The grid of the amplifier tube 50 being positively or negatively charged according to the alternations of the track control current will control directly the flow of current in the plate cathode circuit of the radio tube 50, causing in turn the vibration of the reed 18 corresponding to the frequency of the rail current. Since the radio tube 50 acts as a rectifier, the vibrating reed relay is provided with a range-doubling device whereby two complete vibrations will occur for each cycle of current, assuring a steady operation of the grid-glow tube.

At each closing of the contact 19 with the vibrating reed relay, the grid 14 of the grid-glow tube becomes grounded through reed 18 and conductor 58. This renders the grid-glow tube conductive through the "Proceed" lamp, and conductor 35 to the B+ terminal.

A blocked condition of the grid-glow tube 10 occasioned by the inoperativeness of the reed 18 initiates "Stop" signal indication in the manner explained above. Likewise under "Caution" conditions, the lamps will flash alternately as described above.

Figure 5 illustrates a cab signal and train stop system of the intermittent-inductive, non-contact type. This system is of a type particularly designed to operate on railroads where the wayside signals are being operated manually or mechanically, and where no continuously flowing track signaling currents are in use. This system of cab signaling is designed to initiate only two visible cab signals P (Proceed) and D (Danger) and sound a warning whistle 41 in time of danger. This whistle is interconnected with the train brake system in a manner to apply the vehicle brakes while it sounds. The automatic brake application may be counteracted by the operator if he is alert by operating the release button 24. This system may also be elaborated upon by the addition of a few parts shown in the description of system Figure 3. In this case three signal light indications may be shown in the vehicle cab, the "Proceed", the "Caution" and the "Stop" indication.

Referring to Figure 5, a simple roadway signaling circuit and the equipment for a vehicle are illustrated. The roadway control circuit shown is designed for railroads where the tracks are not blocked and are unbonded, and where D. C. batteries are being used to operate wayside signal equipment in the absence of A. C. transmission lines. The wayside circuit shown is basic only. It is designed to operate on railroads in Europe where only a distant signal location cab signal is favored and where fewer wayside signals are operated by continuous A. C. or coded D. C. track control currents. The system is of course also suited for installations on American railroads where such conditions exist. The system is operated non-contact inductively, there is no physical contact between roadway apparatus and vehicle equipment. In my description, it will be pointed out that the system places a "check-up" on the vehicle operator at the start of each indication section.

In the system shown in Figure 5, a section of the regular track rails in advance of a wayside signal location is electrified. The length of this electrified signal-indication track section may be 60 feet and the start of the section or entering end may be located about 1320 feet in advance of the wayside signal location at the point where an advance cab signal indication is desired. One or both of the track rails on one side of the short block in section B in Figure 5, should be of the non-magnetic type, such as manganese-steel rails. These rails are particularly suitable for this purpose. The rails in sections A and C are of the conventional magnetic type. Rails on both sides of the electrified section B should preferably be bonded at the joints of the rails. A galvanic battery, driving a motor-alternator set, supplying 60 to 100 cycle current of about 15 volts may be used to supply a current of about 2.0 amperes for the roadway equipment. Alternating current of the same voltage and at a frequency of preferably between 60 cycle and 100 cycle may also be used directly. Also, a direct-current motor driving an interrupter device may be used to change the direct battery current into a fast pulsating-direct current, say, of not less than 3600 pulsations per minute. In the system shown in Figure 5, the coder will interrupt the supply current into codes, interrupting the flow of direct current to the rails of section B 3600 times per minute. It is of course possible that additional codes or other codes may be used for the purpose of initiating more than two cab signal indications, as disclosed in connection with Figure 3. If it is undesirable for the railroad to install non-magnetic rails in section B, a section of discarded track rails may be placed either between the track rails or along side of them. These rails serve to act as an armature of the magnetic relay EM described further on.

If these armature rails are being utilized it would be advisable to connect them serially with the rail control currents to guard against displacement or loss of the armature rail section. However, if this extra section of indicating armature rails is being utilized instead of the non-magnetic rails, a few minor circuit changes on the vehicle would have to be made, referring to the EM relay.

Where non-magnetic rails are used for crossovers and "frogs", regular magnetic steel rails may be placed along side of the non-magnetic track rails to attract the magnet 70. Also, the non-magnetic rails of the cross-overs and "frogs" may be supplied with pulsating direct current or alternating current. The pickup transformer PT with the windings W and W' may then act to maintain a "Proceed" condition on the vehicle by being influenced by the fields created around the track rails by the rail control currents.

Whenever the semaphore-signal-arm is in the "Proceed" position, as shown in Fig. 5 in dotted lines, a switch SW operated in any suitable manner by the signal arm itself, closes the operating circuit for the coder motor or the motor of the motor-generator set as conditions may be by closing the circuit through conductors 406 and 407. Regular track relays or line relays where used, or the levers of interlocking machines, may also serve to operate as switches to open and close the short track circuit. However, the supply of coded current to the rails of track section B will remain interrupted until a vehicle enters block B, permitting the track current to flow from the rails on one side of the block to the rails of the other side of the block through the wheels and axles of the vehicle. This circuit when completed may be traced from the positive side of the line 405, across the contacts of switch SW, conductor 406', brush b, coder c, conductor 408, rail 1 in section B, across the vehicle axles to rail 1', and through line 409 to the negative side of the line 407.

The vehicle circuits are similar to the circuits described and shown in Figures 1 and 2. However, in this system of Figure 5, we add a pneumatically operated valve, the timing valve TV, and also a magnetically operated relay called the magnetic relay EM. The EM relay is composed of an operating electro-magnet 70, energized from the vehicle current supply. The magnet 70 may also be of the permanent type. The magnet 70 is mounted on the lower end of the stem 71 and a contactor member 72 is mounted on the top end of the stem 71. The EM relay is mounted over and near the top of the track rails, with the two poles of the magnet EM paralleling the horizontal top of the track rails. The two magnet poles may be mounted about ½ inch above the top of the rails when the magnet is attracted and held in the "down" position by the regular magnetic steel track rails. The EM relay is preferably mounted on the super-structure of the vehicle carrying the axle bearings, so that the distance between the pole pieces of the magnet M and the top of the track rails does not vary. The upward movement of the stem 71 with the magnet 70 is about ¼ inch. Therefore, while the magnet M will pass above a non-magnetic manganese steel rail section, the stem 71 with the magnet 70 will move upward, so that the two pole pieces of the magnet are now about ¾ inch above the top of the track rail. Preferably, the magnetic relay EM should be mounted near the cab end of the vehicle. While the relay stem 71 is in the "up" position, the contactor member 72 connected electrically with the B negative pole of the vehicle current supply mounted thereon, will close the contact 73, supply B negative current to the wire 232. While the relay stem is in the "down" position, the contactor member 72 closes the contacts 76 and 77, supplying B negative current to wires 234 and 163, passing through conductors 161 and 74 to the contactor 72.

The pick-up transformer PT, mounted about 6 inches above the rails, is similar in construction to those known in the prior art and indicated generally in Figures 1–4. This transformer is mounted on the front end of the vehicle in advance of the first pair of vehicle wheels.

The system shown in Figure 5 operates in the following manner:

When a vehicle is operating in unsignaled territory as in sections C and A, the magnet relay EM and the stem 71 carrying the magnet winding 70 thereon will be pulled to the "down" position by the magnetic rails. The operating circuit of the pilot light Pt is closed at contacts 76 and 77 bridged by contact 72 through the B— terminal, conductor 35, the Pt lamp, conductor 234, contact 77, contactor 72, conductors 74 and 161 to the B— terminal. The pick-up transformer remains deenergized since no current is flowing in the track rails. The grid-glow tube remains non-conductive for the reason that it has no leakage path for the electron charge accumulated on the grid. The primary and secondary windings of the input transformer 3, 4 are deenergized and the amplifier 50 is inoperative. A "Proceed between signal points" cab signal indication prevails.

When a train enters the signaling track section B while the signal arm of the wayside semaphore signal is in the "Proceed" position, the coder motor will operate. As explained above, a pulsating track signaling current will flow from one side of the D. C. supply conductors 405, 406 and 406' through the brush, wire 408, to rail 1, and through wheels and axles of the rail vehicle to rail 1', through wires 409 and 410 to the other pole of supply. A current similar in code frequency of the track current will be induced in the pick-up transformer PT and the primary and secondary winding of the input transformer. The plate-cathode circuit of the radio tube 50, including the operating winding of the vibrating-reed unit, will become closed. The reed 18 will vibrate at the frequency of the code, closing contact 19. The anode-cathode circuit, including the operating winding of the relay 221, will become closed through the B+ terminal, the anode-cathode circuit of the grid-glow tube 10 and through wire 238 to the B— terminal. The relay 221 picks up its armature 222, closing contacts 227, 228 and 229. The magnet 70 and the stem 71 in the EM relay, being over the non-magnetic track rail, will be in the "up" position. The contactor 72 closes the contact 73 which serves to close the operating circuit for the P signal light through the circuit extending from the B+ terminal, conductor 35, lamp P, conductor 230, contact 227, armature 222, contact 229, conductor 232, contact 73, contactor 72, conductors 74 and 161 to the B— terminal. The solenoid coil 40 of air valve 40V is energized through an operating circuit extending from the B+ terminal, the winding of solenoid 40, conductor 239, contact 228, armature 222, contact 229, conductor 232, contact 73, contactor 72, and conductor 74 and 161 to the B— terminal.

When a train enters the signaling track section B while the arm of the wayside signal is in "Danger" position, as shown in Figure 5, no current will flow in the track rails 1 and 1' since the operating circuit for the coder motor is open at the switch Sw. The pick-up circuit is deenergized. The magnet 70 and the stem 71 of the relay EM is in the up position, since the magnet is over a non-magnetic rail. The grid-glow tube is blocked and the relay 221 is deenergized, whereby the armature 222 bridges contacts 223 and 225, which completes the operating circuit for the "Danger" signal light D through a circuit extending through the B+ terminal, wire 35, lamp D, conductor 224, contact 223, armature 222, contact 225, conductor 226, conductor 232, contact 73, contactor 72, and conductor 74 and 161 to the B— terminal.

The circuit for the operating winding of the solenoid 40 is open at the contact 228 of the relay 221. Compressed air enters chamber 301 of the timing valve TV through the valve 40V. The piston 302 is pushed downwardly against coil spring pressure and air pressure. Compressed air passes from the train brake pipe through the valve 140 and pipe 142 to exhaust to the atmosphere through the exhaust port of the warning whistle 41, sounding the whistle. As long as the valve 140 is open and air is passing through pipe 142, the train brakes will be applied. After the valve 40V closes, the air above the piston 302 and the air in the pipe line 303 slowly exhausts to the atmosphere through the small exhaust port 304 on top of the timing valve TV. The exhaust of the air through this small port must be slow enough so that the train brakes will be applied to stop the vehicle.

Of course, in this arrangement as well as in those described above, the operator may press the release button 24 for the purpose of acknowledging a restrictive condition and which in effect prevents the deenergization of the solenoid 40.

In all cases, if a direct current potential is used on the vehicle instead of an alternating current, the wire connection 310 shown in dotted lines is connected to the contact 75 of the relay EM and the wire 238 is no longer connected to wire 160.

With direct current on the anode, the grid-glow tube will not break down until the grid potential reaches the critical value. After breakdown, even though the grid excitation may have been brief and may subsequently change, the anode current would continue to flow, the contactor 72 in the EM relay however, will interrupt the anode-cathode current when the stem 71 is pulled downward by the magnetic steel rails after the vehicle has passed out of the signaling section of the track.

The three hookups shown may be modified, or parts of any of the circuits may be combined with parts of other circuits and be made adaptable to operate on any railway vehicle, may it be propelled by steam, electricity or Diesel power. Absence of electrically tuned circuits, and the absence of a plurality of complicated mechanically operated relays as compared with other systems, few wearing parts, immunity against interference from inductive fields from electric equipment located near the tracks, non-interference from high tension transmission lines, makes my system outstanding in the art. This system is not responsive to harmonics of the standard frequency of the track control currents or to currents of the propelling power of electrically operated rail vehicles.

The "Frahm" vibrating-reed relays here proposed for use, have been described in detail in my co-pending application referred to above. They are distinctly different from other electrical relays. They have no pivots, jewels or rotating parts, simply a small electro-magnet and a set of very accurately tuned steel reeds which operate the proper contacts at the correct resonance of the track control currents. Groups of the reeds may be used in lieu of single reeds as fully described in my application Serial No. 88,907, Patent No. 2,105,134, January 11, 1938, and as shown in Figures 3 and 4 herein.

All of the foregoing features make my new system of cab signaling simple, effective and foolproof. The use of the grid-glow tube and the use of the vibrating-reed relay, with one or more reeds tuned to vibrate very closely on the frequency they are adjusted for, in place of many complicated tuned vehicle circuits and a vast number of expensive relays and parts as now generally in use in other cab signaling systems, serve to cut the cost of such equipment and upkeep of the installation to a minimum. At the same time, a highly sensitive and rugged arrangement is attained.

What I claim is:

1. In an automatic train control system, a trackway circuit for conducting electric currents, a receiver for said currents carried by a vehicle traveling over said trackway comprising a transformer inductively coupled with the trackway, control means on said vehicle for controlling the operation thereof, a luminous device energized by the currents induced in said receiver, a cold element grid-glow device governing the operation of said control means, and a light-sensitive cell in the field of operation of said luminous device and controlled thereby for affecting said grid-glow device to operate said control means.

2. In an automatic train control system, a trackway circuit for conducting electric current of predetermined frequency, a receiver for said current mounted on a vehicle travelling over said trackway, comprising a pick-up device for said current, a tuned mechanical switching unit responsive to the frequency of said current, a grid-glow device having a blocking electrode for controlling the conductivity of said device, an electromagnet in the output circuit of said grid-glow device for operating said mechanical switching unit and for energizing a signal lamp thereby, a control relay in circuit with said grid-glow device energized by the conductive condition of said grid-glow device, a second signal lamp energized by the deenergization of said control relay in consequence of the non-conductive condition of said grid-glow device, and means in said receiver for controlling the potential of said blocking electrode in response to the conditions of the trackway circuit.

3. The combination set forth in claim 2 wherein said last mentioned means comprises a photoelectric device and a luminous device in the field of view of said photo-electric device energized from the current flowing in the trackway circuit and controlling said photo-electric device.

4. In an automatic train control system, a trackway circuit for conducting electric current of predetermined frequency, a receiver for said current mounted on a vehicle travelling over said trackway comprising a pick-up device for said current, a tuned mechanical switching unit responsive to the frequency of said current, a grid-glow device having a blocking electrode for controlling the conductivity of said device, means for controlling said blocking electrode by said mechanical switching unit, a signal lamp energized by the operation of said mechanical switching unit, a control relay in circuit with said grid-glow device energized by the conductive condition of said grid-glow device when said magnetic switching unit is operative, and a second signal lamp energized by the deenergization of said control relay during the blocked condition of said grid-glow device.

5. In an automatic train control system, a trackway circuit for conducting electric current of predetermined frequency, a pick-up device on a vehicle traveling over said trackway in coupling association with said electric current, an amplifier for the energy induced in said pick-up device, a coil in the output circuit of said amplifier, a tuned mechanical vibrating reed unit controlled by said coil, a grid-glow device having a blocking electrode for controlling the conductivity thereof controlled by the operation of said vibrating reed in response to current of predetermined frequency flowing in said coil, a signal lamp energized during the conductive condition of said grid-glow device while said vibrating reed unit is operative, a control relay in circuit with said grid-glow device energized by the conductive condition of said grid-glow device, and a second signal lamp energized by the deenergization of said control relay during the blocked condition of said grid-glow device while said first signal lamp is rendered inoperative thereby.

6. In an intermittent-inductive type train signaling system including a non-magnetic rail section and blocks containing magnetic rails, a trackway circuit for conducting at times electric current of predetermined frequency to said section, a pick-up device on a vehicle travelling over said trackway in coupling association with said electric current, an electromagnet operated by the current in said pick-up device, a tuned mechanical vibrating reed unit controlled by said electromagnet, a grid-glow device having a blocking electrode for controlling the conductivity thereof, said grid-glow device adapted to be rendered conductive by the operation of said vibrating reed unit in response to currents of predetermined frequency flowing in said electromagnet, an auxiliary relay in circuit with said grid-glow device energized by the conductive condition of said grid-glow device, a signal lamp energized by the operation of said auxiliary relay, a second signal lamp energized by the deenergization of said auxiliary relay, a third signal lamp energized during the travel of said vehicle through the blocks containing magnetic rails, and a magnetically controlled switching mechanism biased in one position and operated by the magnetic rails into another position for conditioning said third signal lamp for operation and caused to assume said one position by said non-magnetic rail section for conditioning said first and second signal lamps for operation.

7. The combination set forth in claim 6 wherein a vehicle brake application device is controlled by said auxiliary relay.

8. The combination set forth in claim 2 including a vehicle brake application device controlled by said control relay, and manually operated means for modifying the control of said brake application device normally exercised by said control relay.

9. The combination set forth in claim 6 including a vehicle brake application device controlled by said auxiliary relay, and manually operated means for modifying the control of said brake application device normally exercised by said control auxiliary.

10. In an automatic train control system, a trackway circuit for conducting electric current of predetermined frequency, a receiver for said current mounted on a vehicle travelling over said trackway, a vibrating mechanical relay having a critical adjustment corresponding to the predetermined frequency of said electric current, a grid-glow device having a blocking electrode for controlling the conductivity of said device, said vibrating mechanical relay and said grid-glow device being connected with each other to critically control the operation of said relay in response to said current of predetermined frequency induced in said receiver, and indicating and controlling devices on said vehicle operated in accordance with the condition of the trackway circuits by the conjoint action of said vibrating mechanical relay and grid-glow device.

11. In an automatic train control system, a trackway circuit for conducting electric current of predetermined frequency, a receiver for said current mounted on a vehicle travelling over said trackway, a vibrating mechanical relay having a critical adjustment corresponding to the predetermined frequency of said electrical current, said vibrating mechanical relay including a plurality of mechanical reeds having a mechanical resonance slightly above and below said predetermined frequency in addition to one tuned to said frequency, a grid-glow device having a blocking electrode for controlling the conductivity of said device, said vibrating mechanical relay and said grid-glow device being connected with each other to critically control the operation of said relay in response to said current of predetermined frequency induced in said receiver, and indicating and controlling devices on said vehicle operated in accordance with the condition of the trackway circuits by the conjoint action of said vibrating mechanical relay and grid-glow device.

12. In an intermittent inductive train control system including blocks containing magnetic rails and a non-magnetic rail section in advance of a train indicating block, a trackway circuit for conducting at times electric current of predetermined frequency to said section, a pick-up device on a vehicle travelling over said trackway in coupling association with said electric current, a thermionic amplifier for the energy induced in said pick-up device, an electromagnet in the output circuit of said amplifier, a tuned mechanical vibrating reed unit controlled by said electromagnet, a grid-glow device having a blocking electrode for controlling the conductivity of said device, said grid-glow device adapted to be rendered conductive by the operation of said vibrating reed unit in response to current of predetermined frequency flowing in said electromagnet, an auxiliary relay in circuit with said grid-glow device energized by the conductive condition of said grid-glow device, a signal lamp energized by the operation of said auxiliary relay, a second signal lamp energized by the deenergization of said auxiliary relay, and a magnetic switching mechanism embodying biasing means normally effective for conditioning said signal lamps for operation, said switching mechanism adapted to be attracted by said magnetic rails in opposition to said biasing means and controlled by said non-magnetic rail section to permit said biasing means to become effective.

13. In an automatic train control system of the type in which currents corresponding to traffic conditions are intermittently transmitted inductively from the trackway to a moving vehicle, a train block provided with a wayside signal, a signal controlled section of rails ahead of said train block a distance depending upon the desired period of vehicle cab signaling prior to the entry of the vehicle into said train block, the rails in said train block and section having different magnetic characteristics, means for feeding electric current of predetermined frequency into said section of said rails in accordance with the traffic condition of the train block, a magnetically controlled switch device biased in one position mounted on the moving vehicle in proximity to the trackway alternately positioned by the different magnetic characterstics of the trackway in said train block and section, signal devices mounted on said vehicle, and electric circuits including said signal devices and conditioned for operation by the movement of said switch device, and said electric circuits including a pick-up device on said moving vehicle in coupling association with said electric current of predetermined frequency.

14. In an intermittent inductive automatic train control system, a train block provided with a wayside signal, a signal controlled section of rails ahead of said train block for transmitting inductively to a vehicle passing therethrough signaling currents corresponding to the traffic condition of said train block, said section of rails being ahead of said train block a distance depending upon the desired time interval of vehicle cab signaling prior to the entry of the vehicle into said train block, the rails in said train block and section having different magnetic characteristics, means for feeding electric current of predetermined frequency into said section of said rails in accordance with the traffic condition of the train block, a magnetically controlled switch device biased in one position mounted on the moving vehicle in proximity to the trackway alternately positioned by the different magnetic characteristics of the trackway in said train block and section, signal devices mounted on said vehicle, a pick-up device mounted on said vehicle in proximity to the trackway, and a receiver on said vehicle for the energy induced in said pick-up device including said signal devices, and electric circuits therefor conditioned for operation by the movement of said switch device.

15. In an intermittent inductive automatic train control system, a train block provided with a wayside signal, a signal controlled section of rails ahead of said train block for transmitting inductively to a vehicle passing therethrough signaling impulses corresponding to the traffic condition of said train block, the rails in said train block and section having different magnetic characteristics, means for feeding electric currents of predetermined frequency into said section of said rails in accordance with the condition of the train block, a magnetically controlled switch device biased in one position mounted on the moving vehicle in proximity to the trackway alternately positioned by the different magnetic characteristics of the trackway in said train block and section, signal devices mounted on said vehicle, a pick-up device mounted on said vehicle in proximity to the trackway, and a receiver on said vehicle for the energy induced in said pick-up device including said signal devices and electric circuits therefor conditioned for operation by the movement of said switch device, said receiver also including a mechanical vibrating reed unit tuned to currents fed to said track section, a grid-glow device having a blocking electrode for controlling the conductivity of said device controlled by said vibrating reed unit, a relay in circuit with said grid-glow device energized during the conductive condition of said grid-glow device, and an armature operated by said relay for controlling said signal devices.

16. In an intermittent inductive automatic train control system, a train block provided with a wayside signal, a signal controlled section of rails ahead of said train block for transmitting inductively to a vehicle passing therethrough signaling impulses corresponding to the traffic condition of said train block, the rails in said train block and section having different magnetic characteristics, means for feeding electric currents of predetermined frequency into said section of said rails in accordance with the traffic condition of the train block, a magnetically controlled switch device biased in one position mounted on the moving vehicle in proximity to the trackway alternately positioned by the different magnetic characteristics of the trackway in said train block and section, signal devices mounted on said vehicle, a pick-up device mounted on said vehicle in proximity to the trackway, and a receiver on said vehicle for the energy induced in said pick-up device including said signal devices and electric circuits therefor conditioned for operation by the movement of said switch device, said receiver also including a mechanical vibrating reed unit tuned to currents fed to said signal controlled section, a grid-glow device having a blocking electrode for controlling the conductivity of said device controlled by said vibrating reed unit, a relay in circuit with said grid-glow device energized during the conductive condition of said grid-glow device, an armature operated by said relay for controlling said signal devices, and a solenoid operated timing valve for controlling the application of the brakes of said vehicle controlled by said armature.

17. In an intermittent inductive automatic train control system, a train block provided with a wayside signal, a signal controlled section of rails ahead of said train block for transmitting inductively to a vehicle passing therethrough signaling impulses corresponding to the traffic condition of said train block, the rails in said train block and section having different magnetic characteristics, means for feeding electric currents of predetermined frequency into said section of said rails in accordance with the traffic condition of the train block, a magnetically controlled switch device biased in one position mounted on the moving vehicle in proximity to the trackway alternately positioned by the different magnetic characteristics of the trackway in said train block and section, signal devices mounted on said vehicle, a pick-up device mounted on said vehicle in proximity to the trackway, and a receiver on said vehicle for the energy induced in said pick-up device including said signal devices and electric circuits therefor conditioned for operation by the movement of said switch device, said receiver also including a mechanical vibrating reed unit tuned to currents fed to said track section, a grid-glow device having a blocking electrode for controlling the conductivity of said device controlled by said vibrating reed unit, a relay in circuit with said grid-glow device energized during the conductive condition of said grid-glow device, an armature operated by said relay for controlling said signal devices, a solenoid operated timing valve for controlling the application of the brakes of said vehicle controlled by said armature, and manually operated means for modifying the control of said timing valve exercised normally thereupon by said armature.

18. In an intermittent inductive automatic train control system, a train block provided with a wayside signal, a signal controlled section of rails ahead of said train block for transmitting inductively to a vehicle passing therethrough signaling impulses corresponding to the traffic condition of said train block, the rails in said train block and section having different magnetic characteristics, means for feeding electric currents of predetermined frequency into said section of said rails in accordance with the traffic condition of the train block, a magnetically controlled switch device biased in one position mounted on the moving vehicle in proximity to the trackway alternately positioned by the different magnetic characteristics of the trackway in said train block and section, signal devices mounted on said vehicle, a pick-up device mounted on said vehicle in proximity to the trackway, and a receiver on said vehicle for the energy induced in said pick-up device including said signal devices and electric circuits therefor conditioned for operation by the movement of said switch device, said receiver also including a thermionic amplifier for the energy induced in said pick-up device, an electromagnet in the output of said amplifier, a broadly tuned mechanical vibrating reed unit controlled by said electromagnet, a selectively conductive grid-glow device controlled by said vibrating reed unit, an auxiliary relay in circuit with said grid-glow device energized during the conductive condition of said grid-glow device, and an armature operated by said auxiliary relay for controlling said signal devices.

19. The combination set forth in claim 14 wherein said magnetically controlled switch device comprises a movable electromagnet energized by a source of electric energy on the vehicle.

20. In an intermittent inductive automatic train control system, a train block provided with a wayside signal, a signal controlled section of rails ahead of said train block for transmitting inductively to a vehicle passing therethrough signaling impulses corresponding to the traffic condition of said train block, the rails in said train block and section having different magnetic characteristics, means for feeding electric currents of predetermined frequency into said section of said rails in accordance with the traffic condition of the train block comprising an electric circuit having the opposite terminals thereof connected to the opposite rails near the exit ends of said section which circuit may be bridged by the axle of the vehicle travelling through the section, a magnetically controlled switch device biased in one position mounted on the moving vehicle in proximity to the trackway alternately positioned by the different magnetic characteristics of the trackway in said train block and section, signal devices mounted on said vehicle, a pick-up device mounted on said vehicle in proximity to the trackway, and a receiver on said vehicle for the energy induced in said pick-up device including said signal devices and electric circuits therefor conditioned for operation by the movement of said switch device.

MAX THEODORE WINTSCH.

CERTIFICATE OF CORRECTION.

Patent No. 2,188,991. February 6, 1940.

MAX THEODORE WINTSCH.

It is hereby certified that error appears in the printed specification of the above numbered patent requiring correction as follows: Page 6, second column, line 3, claim 9, for the words "said control auxiliary" read said auxiliary relay; and that the said Letters Patent should be read with this correction therein that the same may conform to the record of the case in the Patent Office.

Signed and sealed this 19th day of March, A. D. 1940.

(Seal)

Henry Van Arsdale,
Acting Commissioner of Patents.